United States Patent
Odate

(10) Patent No.: US 7,905,519 B2
(45) Date of Patent: Mar. 15, 2011

(54) VEHICLE SEATBELT APPARATUS

(75) Inventor: Shotaro Odate, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 174 days.

(21) Appl. No.: 12/209,563

(22) Filed: Sep. 12, 2008

(65) Prior Publication Data

US 2009/0066072 A1 Mar. 12, 2009

(30) Foreign Application Priority Data

Sep. 12, 2007 (JP) .................... 2007-236845

(51) Int. Cl.
*B60R 22/34* (2006.01)
(52) U.S. Cl. ........ 280/807; 180/268; 180/270; 242/385; 280/804; 701/45; 701/47
(58) Field of Classification Search .................. 280/804, 280/807; 701/45, 47; 180/268, 270; 242/385
See application file for complete search history.

(56) References Cited

U.S. PATENT DOCUMENTS

| | | | |
|---|---|---|---|
| 6,257,363 B1 * | 7/2001 | Midorikawa et al. | 180/268 |
| 6,485,057 B1 * | 11/2002 | Midorikawa et al. | 280/807 |
| 6,827,308 B2 * | 12/2004 | Fujii et al. | 242/390.9 |
| 6,997,277 B2 * | 2/2006 | Midorikawa et al. | 180/268 |
| 7,040,444 B2 * | 5/2006 | Midorikawa et al. | 180/268 |
| 7,389,843 B2 * | 6/2008 | Midorikawa | 180/268 |
| 7,588,114 B2 * | 9/2009 | Cuddihy et al. | 180/268 |
| 2001/0004030 A1 | 6/2001 | Yano et al. | |
| 2003/0226704 A1 * | 12/2003 | Aoki et al. | 180/271 |
| 2008/0238076 A1 * | 10/2008 | Takao et al. | 280/807 |

FOREIGN PATENT DOCUMENTS

EP 1518766 A1 * 3/2005
JP 2001-163186 6/2001

* cited by examiner

*Primary Examiner* — Paul N Dickson
*Assistant Examiner* — James English
(74) *Attorney, Agent, or Firm* — Rankin, Hill & Clark LLP

(57) ABSTRACT

A vehicle seatbelt apparatus includes a power supply voltage fluctuation detecting section incorporated in a control device for detecting fluctuations of power supply voltage occurring when an engine cranking operation is being performed. The control device changes drive mode of the motor when such fluctuations of the power supply voltage are detected by the power supply voltage fluctuation detecting section.

3 Claims, 6 Drawing Sheets

VEHICLE SEATBELT APPARATUS

FIELD OF THE INVENTION

The present invention relates generally to vehicle seatbelt apparatus and, more particularly, to a vehicle seatbelt apparatus which performs a belt take-up operation during cranking operation of a vehicle engine or power source without causing discomfort to the vehicle occupant.

BACKGROUND OF THE INVENTION

There have been known vehicle seatbelt apparatus of the type wherein when a vehicle passenger or occupant gets off or is going to get off, a seat belt is securely retracted to thereby prevent the seat belt from being caught by a projection in a passenger compartment or by a door of an automobile. By thus retracting the seat belt in conjunction with the action of the vehicle occupant, the seatbelt apparatus is able to enhance the comfort and convenience of vehicle occupants.

A typical example of such comfort vehicle seatbelt apparatus is disclosed in Japanese Patent Laid-open Publication (JP-A) No. 2001-163186, corresponding to U.S. Patent Published Application No. 2001/0004030 A1. In the disclosed vehicle seatbelt apparatus, when a buckle switch detects disengagement of a buckle and a tongue plate of a seat belt, the seat belt is retracted through a motor. In addition, the seat belt is re-retracted under a certain condition as detailed below.

As shown in FIG. 6 hereof, the vehicle seatbelt apparatus 200 described in JP 2001-163186 A (corresponding to US 2001/0004030 A1) is arranged such that when a buckle switch 201 detects disengagement of the buckle and the tang plate (neither shown) of a seat belt 202, a seat belt controller 207 retracts the seat belt 202 through a motor 206. In addition, when an occupant detecting device 203 detects that no occupant is present in the automobile, when a door switch 204 detects that a door is open, and when an engine key switch 205 detects that an engine key is pulled out or is in an off state, the seatbelt controller 207 operates the motor 206 to re-retract the seat belt 202. By thus performing retracting operation two times, the seat belt 202 can be positively retracted into a predetermined storage position.

However, the prior vehicle seatbelt apparatus 200 has a problem that when the seat belt 202 is detached from the vehicle occupant during engine cranking operation where a power supply voltage supplied via an ignition switch (which is closed when the engine key switch 205 is turned to start up the engine) to the seatbelt controller 207 fluctuates largely, a belt take-up or retracting operation performed by way of rotation of the motor 206 becomes sluggish or lacks smoothness, causing discomfort and inconvenience to the vehicle occupant.

SUMMARY OF THE INVENTION

In view of the foregoing prior art problems, it is an object of the present invention to provide a vehicle seatbelt apparatus which is capable of performing a belt take-up operation during engine cranking operation without causing discomfort to a vehicle occupant to thereby improve the convenience of the seat belt apparatus.

To achieve the above-mentioned object, the present invention provides a vehicle seatbelt apparatus, which comprises: a belt reel having a seat belt wound thereon; an electric motor for rotationally driving the belt reel to take up the seat belt; and a control device for controlling an amount of electric power to be supplied to the motor. The control device includes a power supply voltage fluctuation detecting section for detecting fluctuations of power supply voltage supplied from a vehicle-mounted power supply for driving the motor during start-up operation of a vehicle-mounted motive power source. When the power supply voltage fluctuation detecting section detects fluctuations of the power supply voltage occurring during the start-up operation of the vehicle-mounted motive power source, the control device changes drive mode of the motor.

An engine cranking operation which is initiated upon activation of an ignition switch involves a voltage drop occurring due to fluctuations of power supply voltage. Accordingly, if the power supply voltage involving such fluctuations is supplied to the motor, the motor cannot rotate smoothly. Thus, a belt take-up operation which is achieved through rotation of the motor becomes sluggish, causing discomfort to the vehicle occupant. To deal with this problem, the control device of the vehicle seatbelt apparatus according to the present invention includes a power supply voltage fluctuation detecting section for detecting fluctuations of power supply voltage occurring during start-up or cranking operation of an engine (vehicle-mounted motive power source). When the power supply voltage fluctuation detecting section detects fluctuations of the power supply voltage occurring during the start-up operation of the vehicle-mounted motive power source, the control device changes drive mode of the motor. By thus changing the drive mode of the motor, the belt take-up operation during the engine cranking operation can be achieved smoothly without causing discomfort to the vehicle occupant. This will increase the convenience of the seatbelt apparatus.

In one preferred form of the invention, the control device temporarily stops driving of the motor when the power supply voltage fluctuations are detected by the power supply voltage fluctuation detecting section. By temporarily stopping the driving of the motor, a belt take-up operation which is achieved by rotation of the motor is completely independent from a voltage drop caused due to fluctuations of the power supply voltage during the engine cranking operation. Thus, the comfort and convenience of the seatbelt apparatus are highly improved.

Preferably, the vehicle seatbelt apparatus further includes a rotational speed detecting means for detecting a rotational speed of the belt reel, wherein the control device keeps the rotational speed of the motor at a constant speed from when the power supply voltage fluctuation detecting section detects the power supply voltage fluctuations to when the control device determines that the power supply voltage fluctuations do not exist any more. By thus keeping the rotational speed of the motor, a belt take-up operation which is achieved by way of rotation of the motor is extremely smooth and hence is able to improve the comfort and convenience of the seatbelt apparatus.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE PREFERRED EMBODIMENTS

Figure 1:
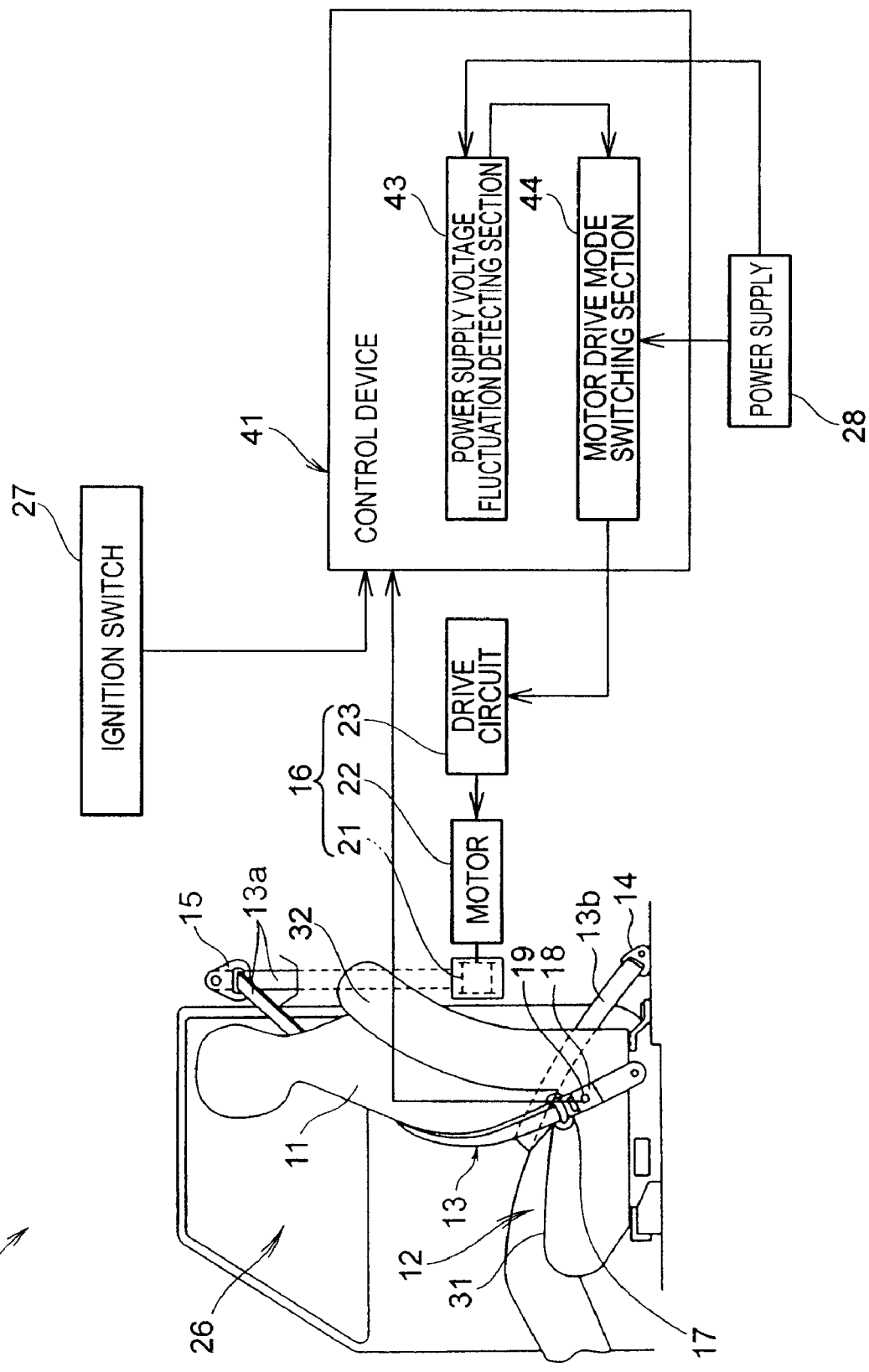
FIG. 1 is a block diagram showing the general configuration of a vehicle seatbelt apparatus according to a first embodiment of the present invention.

First, a description will be given about the general configuration of a vehicle seatbelt apparatus according to a first embodiment of the present invention with reference to FIG. 1. As shown in FIG. 1, the vehicle seatbelt apparatus 10 generally comprises a seat belt (webbing) 13 for tying or restraining a body of a vehicle passenger or occupant 11 to a seat 12 of a vehicle, a belt reel 21 on which the seat belt 13 is wound, an electric motor (drive means) 22 for rotationally driving the belt reel 21 to take up or retract the seat belt 13, and a control means or device 41 for controlling an amount of electric power to be supplied to the motor 22.

The seatbelt 13 is of a three-point support structure, and it includes an upper belt portion 13a for restraining an upper body portion of the vehicle occupant 11 and a lower belt portion 13b for restraining a waist portion of the vehicle occupant 11. The lower belt portion 13b is fixed at one end thereof to a vehicle body portion, located in a lower area of a vehicle passenger compartment 26 by means of an anchor plate 14. The upper belt portion 13a is folded back via a through-anchor 15 provided near the shoulder of the vehicle occupant 11, and it is connected at one end to the belt reel 21 of a retractor 16. A tongue plate 17 is attached to a region of the belt 13 where the respective distal ends of the upper and lower belt portions 13a, 13b merge with each other. The tongue plate 17 is detachably attached to a buckle 18 fixed to one side of a lower seat section of the seat 12, and a buckle switch 19 for detecting engagement and disengagement of the tongue plate 17 with the buckle 18 is provided in the buckle 18. When the buckle switch 19 is in an ON state, it is determined that the tongue plate 17 is in engagement with the buckle 18 and the seat belt 13 is attached around the body of the vehicle occupant 11. Alternatively, when the buckle switch 19 is in an OFF state, it is determined that the tongue plate 17 is disengaged with the buckle 18.

The retractor 16 includes the belt reel 21 rotatably mounted in a housing (not designated), the motor 22 for rotationally driving the belt reel 21, and a drive circuit 23 associated with the motor 22 for driving the same. The control device 41 controls belt take-up operation of the retractor 16 by controlling an amount of electric power (driving electric current) to be supplied through the drive circuit 23 to the motor 22. The retractor 16, whose operation is controlled by the control device 41, is constructed as an electric-type pretensioner (E-PT) for holding the vehicle occupant 11 in a proper posture and position. Stated more specifically, when the buckle switch 19 is turned on (this means that the tongue plate 17 comes in engagement with the buckle 18 and the seat belt 13 is attached around the body of the vehicle occupant 11), the retractor 16 is driven under control of the control device 41 to take up or retract the seat belt 13 in such a manner as to take up or eliminate slack of the seat belt 13. Alternatively, when the buckle switch 19 is turned off (this means that the tongue plate 17 is disengaged from the buckle 18 and the seat belt 13 is detached from the body of the vehicle occupant 11), the retractor 16 is driven under the control of the control device 41 to take up or retract the seat belt 13 in such a manner as to retract the seat belt 13 in a predetermined storage position.

The seat 12 is configured such that it can be moved in a front-back (or longitudinal) direction of the vehicle within the passenger compartment 26 and also can be locked in a desired poison within a range of movement of the seat 12. The seat 12 has a seat cushion 31 for holding or supporting the waist portion of the vehicle occupant 11, and a seatback 32 for retaining a back of the vehicle occupant 11, and a head rest (not shown) for supporting a head of the vehicle occupant 11. The seatback 32 is pivotally connected to the seat cushion 31, and the head rest is mounted to an upper end of the seat back 32 so that a vertical position of the head rest can be adjusted.

The control device 41 is configured to change drive mode of the motor 22 when it is confirmed, by taking in information about an ignition switch 27 (which is turned on to start up a vehicle-mounted motive power source or engine) and information about the buckle switch 19 (which detects engagement/disengagement of the tongue plate 17 with the buckle 18), that the ON/OFF state of the buckle switch 19 has changed over or switched from one state to another while the start-up or cranking operation of the engine is performed. To this end, the control device 41 has a power supply voltage fluctuation detecting function (section) 43 for detecting fluctuations of power supply voltage supplied from the power supply (vehicle-mounted battery) 28, and a motor drive mode switching function (section) 44 for changing the drive mode of the motor 22 when the power supply voltage fluctuation detecting function (section) 43 detects the power supply voltage fluctuations. In the first embodiment shown in FIG. 1, the motor drive mode switching function (section) 44 of the control device 41 operates to stop supply of power from the power supply 28 to thereby temporarily stop driving of the motor 22, as will be described later.

Figure 2:
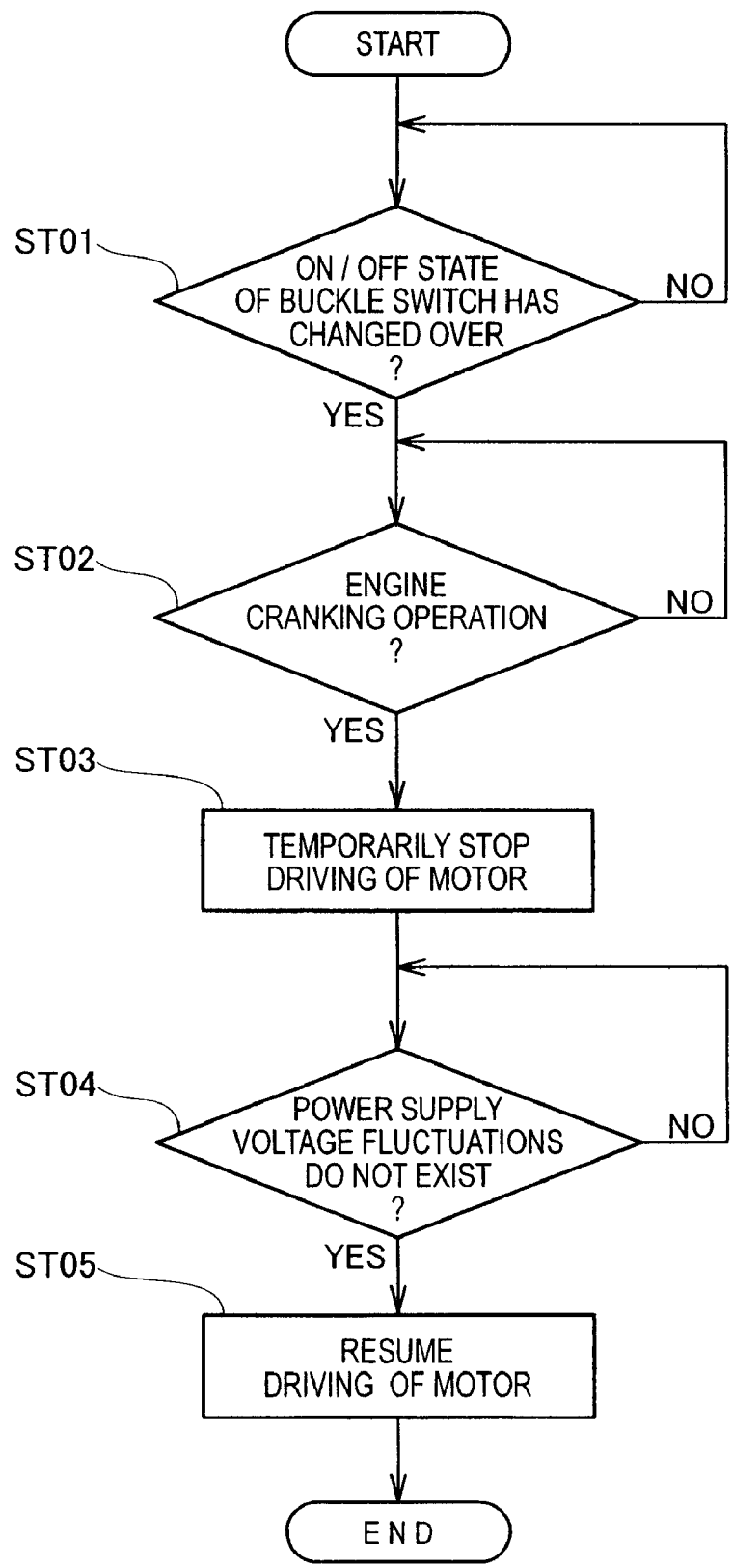
FIG. 2 is a flowchart showing a control flow of a belt take-up operation performed in the vehicle seatbelt apparatus.

With reference to FIG. 2, a description will be given about a control flow of a belt take-up operation performed by the control device 41 when the seat belt 13 is attached around the body of the vehicle occupant 11 or detached from the body of the vehicle occupant 11 while an engine start-up or cranking operation is performed. The belt take-up operation is performed on condition that the buckle switch 19 is turned on or turned off while the ignition switch 27 is in the ON state. When the buckle switch 19 is turned on while the ignition switch 27 is in the ON state, the buckle take-up operation performed by the control device 41 will take up or eliminate slack of the seat belt 13. Alternatively, when the buckle switch 19 is turned off while the ignition switch 27 is in the ON state, the belt take-up operation performed by the control device 41 will retract the seat belt 13 into the predetermined storage position.

As shown in FIG. 2, the control flow begins at step ST01 where on the basis of information collected about the ON/OFF state of the buckle switch 19, a determination is made as to whether the ON/OFF state of the buckle switch 19 has changed over or switched. When a YES determination has been made at step ST01, the control flow goes on to step ST02. With a NO determination at step ST01, the operation at step ST01 is repeated.

At step ST02, on the basis of information collected about the ON/OFF state of the ignition switch 27, a determination is made as to whether an engine start-up or cranking operation is now being performed. When a YES determination has been made at step ST02, the control advances to step ST03. On the other hand, with a NO determination at step ST02, the operation at step ST02 is repeated.

Figure 3:
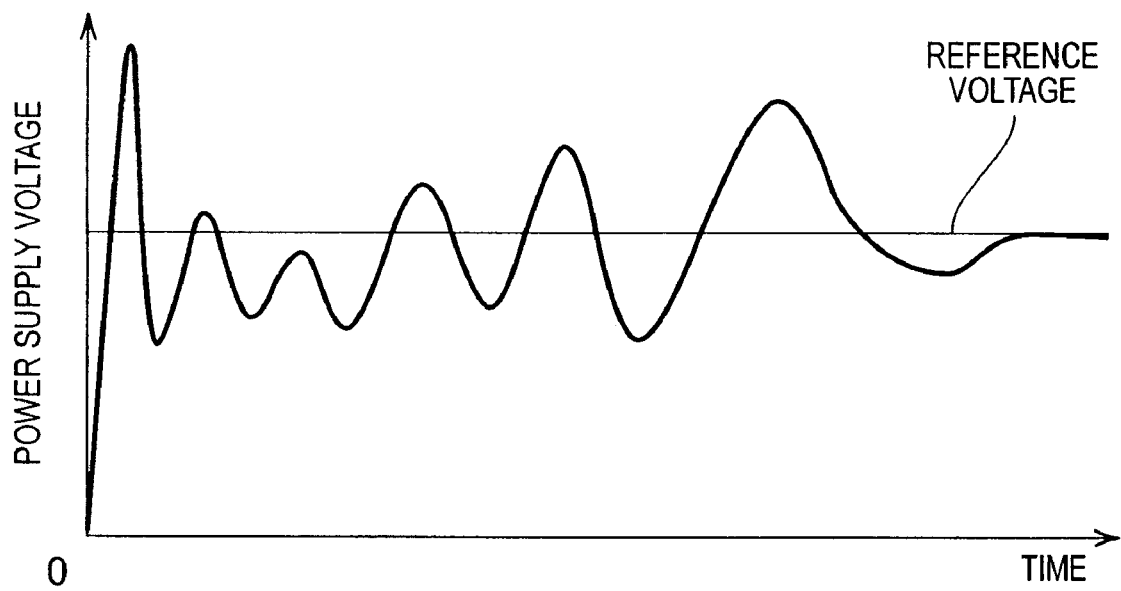
FIG. 3 is a graph showing fluctuation of a source voltage occurring during a cranking operation of a vehicle engine.

As shown in FIG. 3, when the ignition switch 27 is turned on to thereby start up the engine cranking operation, the power supply voltage (line voltage) supplied from the power supply (battery) 28 to the control device 41 for driving the motor 22 first rises acutely above a reference voltage, then drops below the reference voltage, subsequently fluctuates up and down in a region below the reference voltage, thereafter recovers the voltage drop and fluctuates up and down across the reference voltage. The range of power supply voltage fluctuations gradually decrease as time goes on and finally they do not exist (i.e., the power supply voltage is equal in level to the reference voltage).

The power supply voltage fluctuation detecting function (section) 43 of the control device 41 continuously monitors variations of the power supply voltage of the power supply 28 so that the YES determination at step ST02 enables the power supply voltage fluctuation detecting function (section) 43 to detect fluctuations of the power supply voltage supplied from the power supply (battery) 28 for driving the motor 22 during the engine start-up or cranking operation.

It will be readily appreciated from FIG. 3 that if the power supply voltage involving such fluctuations as occurring during engine start-up or cranking operation is supplied to the motor 22, the motor 22 cannot rotate smoothly. Thus, the belt take-up operation of the retractor 16 that is achieved through rotation of the motor 22 becomes sluggish, causing discomfort to the vehicle occupant 11.

To deal with this problem, when the power supply voltage fluctuation detecting function (section) 43 detects the power supply voltage fluctuations occurring during the engine cranking operation, the control device 41 changes the drive mode of the motor 22 by way of a drive mode changing operation achieved by the motor drive mode switching function (section) 44. In the first embodiment shown in FIGS. 1 and 2, the drive mode changing operation is achieved by step ST03 where supply of electric power to the drive circuit 23 of the motor 22 is stopped to thereby temporarily stop driving of the motor 22.

Then, the control advances from step ST03 to step ST04 where by way of the monitoring operation achieved continuously by the power supply voltage fluctuation detecting section 43 for detecting fluctuations of the power supply voltage, a determination is made as to whether the power supply voltage fluctuations do not exist any more (i.e., the power supply voltage is equal in level to the reference voltage). When a YES determination has been made at step ST04, the control goes on to step ST05, which resumes driving of the motor 22 by way of a drive mode changing operation achieved by the motor drive mode switching function (section) 44 of the control device 41. With a NO determination at step ST04, the operation at step ST04 is repeated.

As discussed above with reference to FIG. 3, the engine start-up or cranking operation initiated upon activation of the ignition switch 27 involves a voltage drop caused due to fluctuations of power supply voltage. Accordingly, if engagement/disengagement of the tongue plate 17 with the socket 18 takes place during the engine cranking operation so as to initiate a belt take-up operation of the retractor 16 for the purpose of eliminating slack of the seat belt 13 or retracting the seat belt 13 into the storage position, the belt take-up operation of the retractor 16, which is achieved by way of rotation of the motor 22, becomes sluggish and lacks smoothness due to the aforesaid voltage drop. The sluggish belt take-up operation causes discomfort to the vehicle occupant 11, which will deteriorate the convenience of the seatbelt apparatus 10. However, in case of the seatbelt apparatus 10, the foregoing problems do not actually take place because the control device 41 is able to detect fluctuations of power supply voltage occurring during the engine cranking operation by way of a continuous monitoring operation performed by the power supply voltage fluctuation detecting function (section) 43, and change the drive mode of the motor 22 by way of a drive mode changing operation performed by the motor drive mode switching function (section) 44 when the power supply voltage fluctuations occurring during the engine cranking operation are detected by the power supply voltage fluctuation detecting function (section) 43. By thus changing the drive mode of the motor 22, the belt take-up operation during the engine cranking operation can be achieved smoothly without causing discomfort to the vehicle occupant 11. This will increase the convenience of the seatbelt apparatus 10.

In the first preferred embodiment shown in FIGS. 1 and 2, when the power supply voltage fluctuation detecting function (section) 43 detects fluctuations of the power supply voltage, the motor drive mode switching function (section) 44 temporarily stops driving of the motor 22 until the control device 41 determines, through a continuous monitoring operation by the power supply voltage fluctuation detecting function (section) 43, that the power supply voltage fluctuations do not exist any more. Based on such determination, the motor drive mode switching function (section) 44 performs a drive mode changing operation to resume driving of the motor 22. By thus changing the drive mode of the motor 22, the belt take-up operation of the retractor 16 which is achieved by way of rotation of the motor 22 is completely independent from a voltage drop caused due to fluctuations of the power supply voltage occurring during the engine cranking operation. Thus, the comfort and convenience of the seatbelt apparatus 10 are highly improved.

Figure 4:
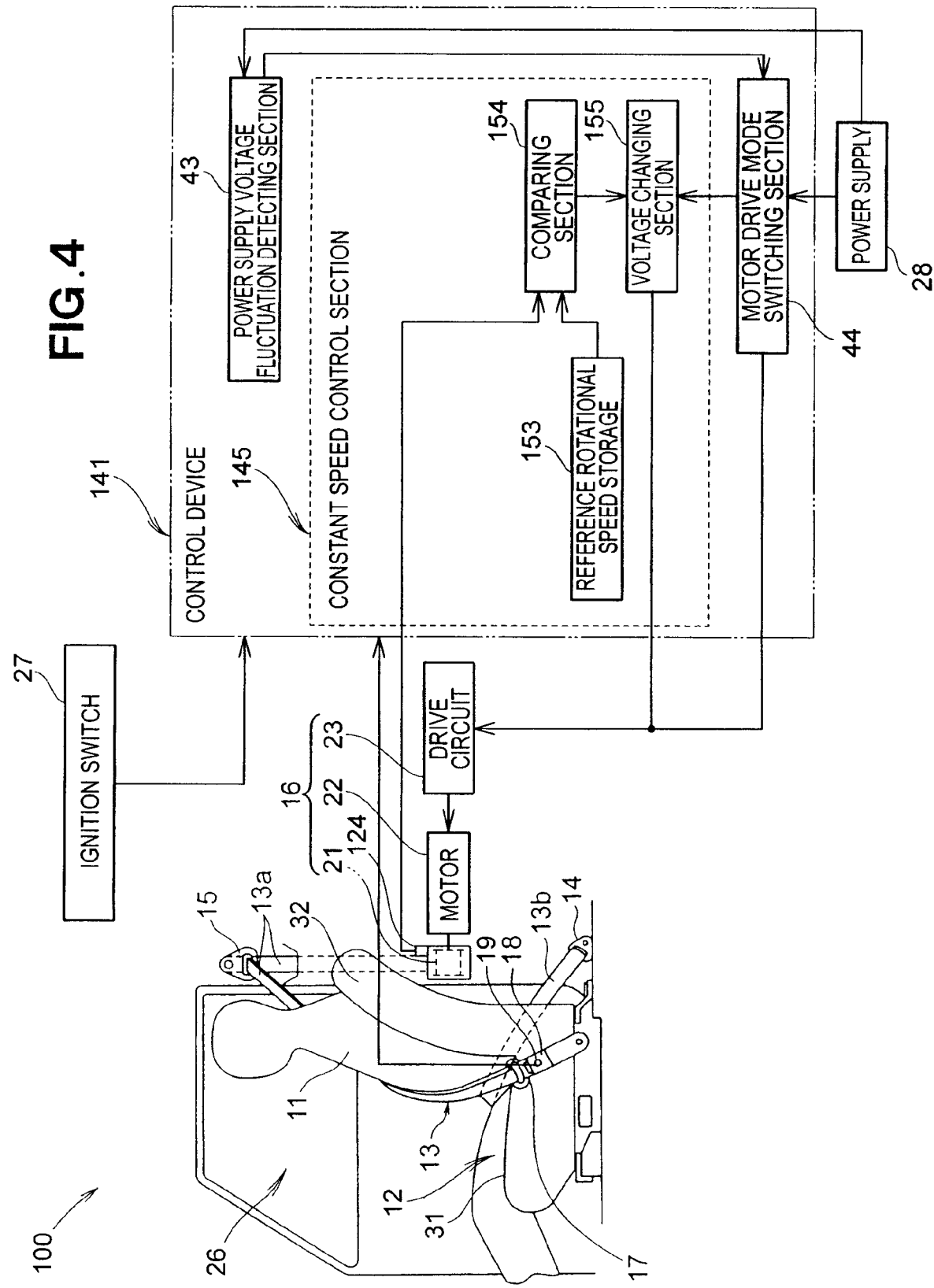
FIG. 4 is a block diagram showing the general configuration of a vehicle seatbelt apparatus according to a second embodiment of the present invention.

FIG. 4 shows in block diagram a vehicle seatbelt apparatus 100 according to a second embodiment of the present invention. The seatbelt apparatus 100 differs from the seatbelt apparatus 10 of the first embodiment only in that a control device 141 is configured to perform a constant speed control operation to keep the rotational speed of the motor 22 at a constant speed from when the power supply voltage fluctuation detecting function (section) 43 detects fluctuations of the power supply voltage to when the control device 141 determines that the power supply voltage fluctuations do not exist any more (i.e., the power supply voltage is free of fluctuations). These parts of the seatbelt apparatus 100, which are identical to those used in the seatbelt apparatus 10 of the first embodiment, are designated by the same reference characters and a further description thereof can be omitted.

In order to achieve the constant speed control operation, the seatbelt apparatus 100 further includes a rotational speed detecting means or sensor 124 for detecting a rotational speed of the belt reel 21, and the control device 141 has a constant speed control function (section) 145. The rotational speed of the belt reel 21, which is detected by the rotational speed sensor 124, is supplied to the constant speed control section 145. The constant speed control section 145 has a comparing function (section) 154 and a voltage changing function (section) 155. The comparing section 145 compares the detected rotational speed of the belt reel 21 with a reference rotational speed which is stored in advance in a reference rotational speed storage 153 of the control device 141. The voltage changing section 155, on the basis of the result of comparison performed by the comparing section 154, changes the voltage level to be supplied to the drive circuit 23.

Figure 5:
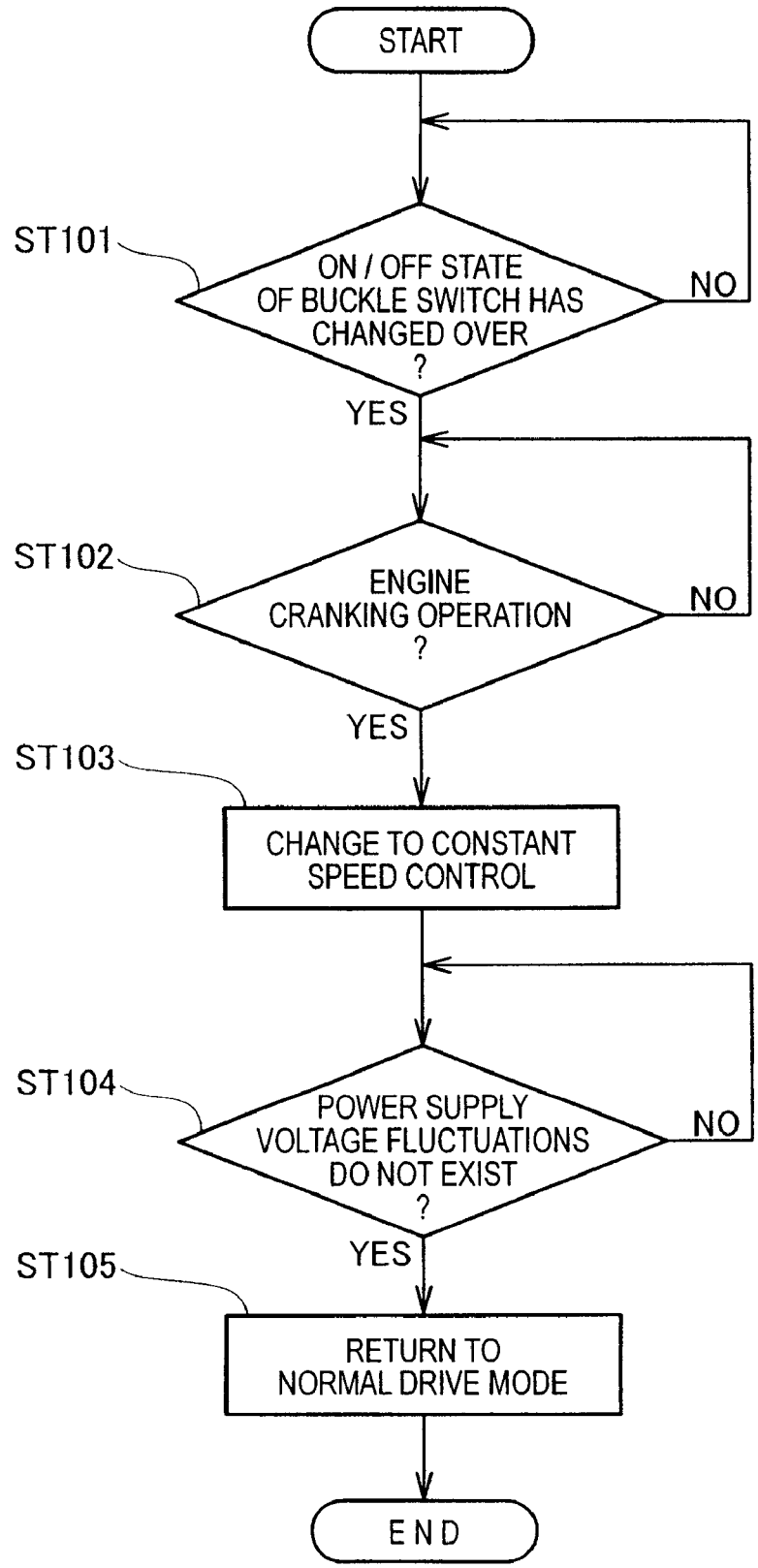
FIG. 5 is a flowchart showing a control flow of a belt take-up operation performed in the vehicle seatbelt apparatus of FIG. 4.
Figure 6:
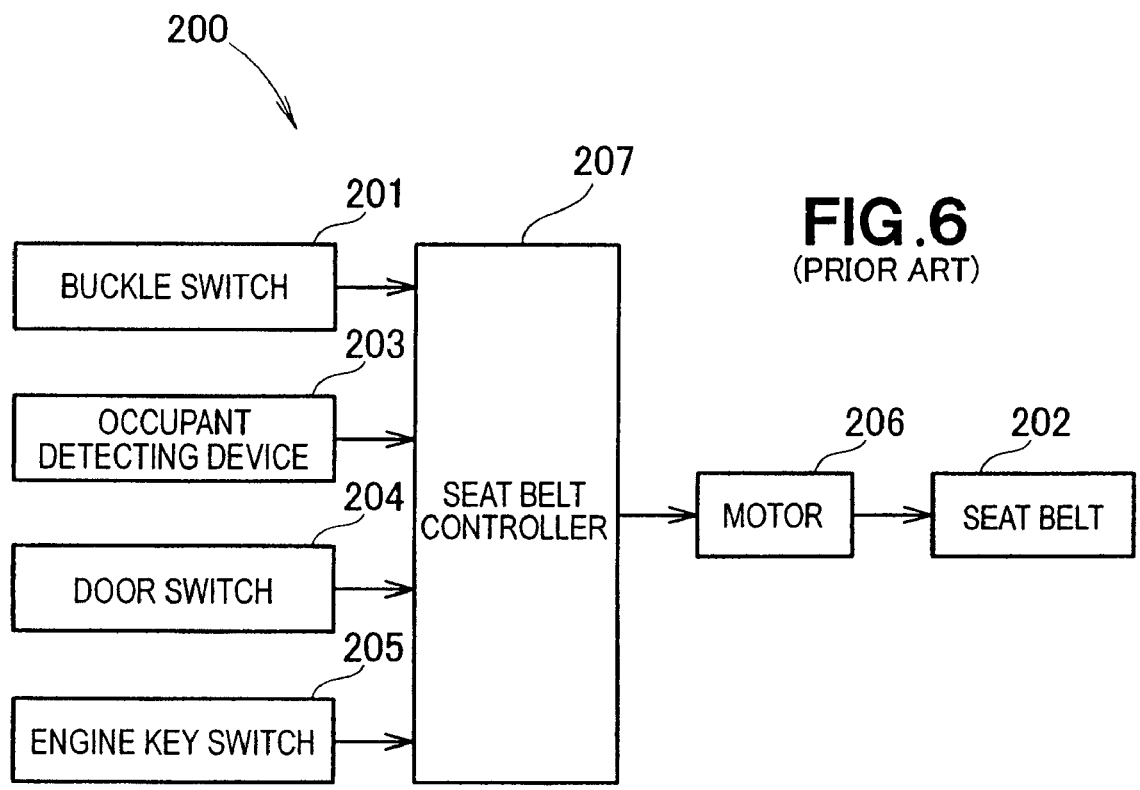
FIG. 6 is a block diagram showing the general configuration of a conventional vehicle seatbelt apparatus.

With reference to FIG. 5, a description will be given about a control flow of a belt take-up operation performed by the control device 141 when the seat belt 13 is attached around the body of the vehicle occupant 11 or detached from the body of the vehicle occupant 11 while an engine start-up or cranking operation is performed. The belt take-up operation is performed on condition that the buckle switch 19 is turned on or turned off while the ignition switch 27 is in the ON state. When the buckle switch 19 is turned on while the ignition switch 27 is in the ON state, the buckle take-up operation performed by the control device 141 will take up or eliminate slack of the seat belt 13. Alternatively, when the buckle switch 19 is turned off while the ignition switch 27 is in the ON state, the belt take-up operation performed by the control device 141 will retract the seat belt 13 into the predetermined storage position.

As shown in FIG. 5, the control flow begins at step ST101 where on the basis of information collected about the ON/OFF state of the buckle switch 19, a determination is made as to whether the ON/OFF state of the buckle switch 19 has changed over or switched. When a YES determination has been made at step ST101, the control flow goes on to step ST102. With a NO determination at step ST101, the operation at step ST101 is repeated.

At step ST102, on the basis of information collected about the ON/OFF state of the ignition switch 27, a determination is made as to whether an engine start-up or cranking operation is now being performed. When a YES determination has been made at step ST102, the control advances to step ST103. On the other hand, with a NO determination at step ST102, the operation at step ST102 is repeated.

The power supply voltage fluctuation detecting function (section) 43 of the control device 141 continuously monitors variations of the power supply voltage of the power supply 28 and, hence, the YES determination at step ST102 enables the power supply voltage fluctuation detecting function (section) 43 to detect fluctuations of the power supply voltage occurring during the engine start-up or cranking operation.

When the power supply voltage fluctuation detecting function (section) 43 detects the power supply voltage fluctuations occurring during the engine cranking operation, the motor drive mode switching function (section) 44 of the control device 141 changes or shifts the drive mode of the motor 22 from a normal drive mode to a constant speed control drive mode. This drive mode changing operation is achieved by step ST103. In the normal drive mode, the motor 22 is driven with the power supply voltage which is supplied from the power supply 28. In the constant speed control mode, the rotational speed of the motor 22 is kept at a constant value regardless of the presence of a voltage drop which may occur due to fluctuations of the power supply voltage while the engine cranking operation is performed.

Then, the control advances from step ST103 to step ST104 where by way of the monitoring operation performed continuously by the power supply voltage fluctuation detecting section 43 for detecting fluctuations of the power supply voltage, a determination is made as to whether the power supply voltage fluctuations do not exist any more (i.e., the power supply voltage is equal in level to the reference voltage). When a YES determination has been made at step ST104, the control goes on to step ST105 where the drive mode of the motor 22 is changed from the constant speed control mode to the normal operation mode by way of a drive mode changing operation achieved by the motor drive mode switching function (section) 44 of the control device 141. With a NO determination at step ST104, the operation at step ST104 is repeated.

As described above, the seatbelt apparatus 100 includes the rotational speed sensor 124 for detecting a rotational speed of the belt reel 21. The detected rotational speed of the belt reel 21 is used as a control variable when the control device 141 performs a constant speed control operation for keeping the rotational speed of the motor 22 at a constant speed from when the power supply voltage fluctuation detecting section 43 detects the power supply voltage fluctuations to when the control device 141 determines that the power supply voltage fluctuations do not exist any more. With the constant speed control operation thus produced, a belt take-up operation of the retractor 16 can be achieved smoothly by way of rotation of the belt reel 21.

The vehicle seatbelt apparatus 10 and 100 of the present invention may be installed in a driver's seat, a front passenger seat, or a rear passenger seat.

Obviously, various minor changes and modifications of the present invention are possible in light of the above teaching. It is therefore to be understood that within the scope of the appended claims the invention may be practiced otherwise than as specifically described.

What is claimed is:

1. A vehicle seatbelt apparatus, comprising:
a belt reel having a seat belt wound thereon;
an electric motor for rotationally driving the belt reel to take up the seat belt;
a vehicle-mounted power supply; and
a control device including an input port connected to the vehicle-mounted power supply and an output port connected to the electric motor, the control device being operable to control an amount of electric power supplied from the output port of the control device to the electric motor,
wherein the control device includes a power supply voltage fluctuation detecting section for detecting fluctuations of a power supply voltage supplied from the vehicle-mounted power supply during start-up operation of a vehicle-mounted motive power source, and
wherein the control device changes drive mode of the electric motor when the power supply voltage fluctuation detecting section detects fluctuations of the power supply voltage at the input port of the control device during the start-up operation of the vehicle-mounted motive power source.

2. The vehicle seatbelt apparatus according to claim 1, wherein the control device temporarily stops driving of the electric motor when the power supply voltage fluctuations are detected by the power supply voltage fluctuation detecting section.

3. The vehicle seatbelt apparatus according to claim 1, further comprising a rotational speed detecting means for detecting a rotational speed of the belt reel, wherein the control device keeps the rotational speed of the electric motor at a constant speed from when the power supply voltage fluctuation detecting section detects the power supply voltage fluctuations to when the control device determines that the power supply voltage fluctuations do not exist any more.

* * * * *